(12) United States Patent
Iguchi et al.

(10) Patent No.: US 11,961,675 B2
(45) Date of Patent: Apr. 16, 2024

(54) CERAMIC ELECTRONIC DEVICE HAVING AN ELEMENT BODY WITH A BOUNDARY LAYER INCLUDING Ba AND Ti AT AN END OF A CERAMIC LAYER

(71) Applicant: TDK CORPORATION, Tokyo (JP)

(72) Inventors: Toshihiro Iguchi, Tokyo (JP); Yuichiro Sueda, Tokyo (JP); Ryota Namiki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 196 days.

(21) Appl. No.: 17/685,018

(22) Filed: Mar. 2, 2022

(65) Prior Publication Data
US 2022/0293343 A1 Sep. 15, 2022

(30) Foreign Application Priority Data
Mar. 8, 2021 (JP) .................. 2021-036541

(51) Int. Cl.
*H01G 4/12* (2006.01)
*H01G 4/232* (2006.01)
*H01G 4/30* (2006.01)

(52) U.S. Cl.
CPC ......... *H01G 4/1209* (2013.01); *H01G 4/2325* (2013.01); *H01G 4/302* (2013.01)

(58) Field of Classification Search
CPC ..... H01G 4/302; H01G 4/2325; H01G 4/1209
See application file for complete search history.

(56) References Cited

U.S. PATENT DOCUMENTS

| 4,982,485 A * | 1/1991 | Nakaya | H01G 4/2325 29/25.42 |
| 5,339,068 A * | 8/1994 | Tsunoda | H01C 1/142 338/308 |
| 2010/0328842 A1* | 12/2010 | Takeuchi | C25D 5/50 361/301.4 |
| 2016/0268046 A1* | 9/2016 | Nishisaka | H01G 4/232 |

FOREIGN PATENT DOCUMENTS

| JP | H04-171912 A | 6/1992 |
| JP | 10294239 A * | 11/1998 |
| JP | 2002170736 A * | 6/2002 |
| JP | 2008124514 A * | 5/2008 |
| JP | 2010027730 A * | 2/2010 |

* cited by examiner

*Primary Examiner* — David M Sinclair
(74) *Attorney, Agent, or Firm* — Oliff PLC

(57) ABSTRACT

A ceramic electronic device includes an element body and an external electrode. The element body is formed by laminating a ceramic layer and an internal electrode layer. The external electrode is electrically connected to at least one end of the internal, electrode layer. The element body includes a boundary layer at an end of the ceramic layer. The ceramic layer includes a perovskite compound represented by $ABO_3$ as a main component. The boundary layer includes Ba and Ti as a main component. The boundary layer includes 0.27-0.40 parts by mol of Ba, provided that a total of Ba and Ti included in the boundary layer is 1 part by mol.

10 Claims, 4 Drawing Sheets

CERAMIC ELECTRONIC DEVICE HAVING AN ELEMENT BODY WITH A BOUNDARY LAYER INCLUDING Ba AND Ti AT AN END OF A CERAMIC LAYER

BACKGROUND OF THE INVENTION

The present invention relates to a ceramic electronic device including a ceramic layer and an internal electrode layer.

As described in Patent Document 1, a multilayer ceramic capacitor is manufactured by laminating ceramic dielectrics in which an electrode material is printed as internal electrodes, firing them to form a ceramic element, and forming external electrodes electrically conducted to the internal electrodes on the external surface of the ceramic element.

However, the bonding strength between the ceramic element (element body) and the external electrodes may decrease due to, for example, thermal shock during cooling after the baking of the external electrodes, during manufacturing, during use, or the like Patent Document 1: JPH04171912 (A)

BRIEF SUMMARY OF THE INVENTION

The present invention has been achieved under such circumstances. It is an object of the present invention to provide a ceramic electronic device having a high bonding strength between an element body and an external electrode.

To achieve the above object, a ceramic electronic device according to the first aspect of the present invention comprises:

an element body formed by laminating a ceramic layer and an internal electrode layer; and an external electrode electrically connected to at least one end of the internal electrode layer, wherein the element body includes a boundary layer at an end of the ceramic layer, the ceramic layer includes a perovskite compound represented by $ABO_3$ as a main component, the boundary layer includes Ba and Ti as a main component, and the boundary layer includes 0.27-0.40 parts by mol of Ba, provided that a total of Ba and Ti included in the boundary layer is 1 part by mol.

In the multilayer ceramic capacitor according to the present invention, it is possible to effectively prevent a thermal stress generated on an interface between the external electrode and the ceramic layer due to, for example, thermal shock during cooling in the baking, during manufacturing, during use, or the like. The reason is considered to be as follows.

In the present invention, the ceramic layer includes a perovskite compound represented by $ABO_3$ as a main component, and the element body includes the boundary layer containing Ba and Ti in a predetermined molar ratio at the end of the ceramic layer. "A" of $ABO_3$ is a substitutable component of Ba, and "B" of $ABO_3$ is a substitutable component of Ti. Thus, it is considered that the dielectric layer and the boundary layer are easy to be diffused to each other, and that the dielectric layer and the boundary layer are firmly bonded to each other.

It is further considered that the Ti content is higher than the Ba content in the boundary layer, and the external electrode and the boundary layer are thereby firmly bonded to each other. In the present invention, since the external electrode and the boundary layer are firmly bonded as well as the ceramic layer and the boundary layer are firmly bonded, the element body and the external electrode are firmly bonded. The fact that the bonding strength is high can be confirmed by, for example, tensile strength test.

The perovskite compound may be represented by $(Ba_{1-a-b}Sr_aCa_b)_m(Ti_{1-c-d}Zr_cHf_d)O_3$ and satisfy $0.94<m<1.1$, $0 \le a \le 1$, $0 \le b \le 1$, $0 \le c \le 1$, and $0 \le d \le 1$.

Preferably, the perovskite compound represented by $(Ba_{1-a-b}Sr_aCa_b)_m(Ti_{1-c-d}Zr_cHf_d)O_3$ satisfies $\kappa \le a<1$, $0 \le b<1$, $0 \le c<1$, and $0 \le d<1$.

Since Ba and Ti are contained in both of the ceramic layer and the boundary layer, Ba and Ti are easier to be diffused to each other, so that the ceramic layer and the boundary layer are more firmly bonded to each other.

Preferably, the external electrode includes at least one of Cu, Cu alloys, Ag, and Ag alloys as a main component.

Thus, a linear expansion coefficient γ of the boundary layer is smaller than a linear expansion coefficient β of the conductor and larger than a linear expansion coefficient α of the ceramic layer. In the present invention, it is considered that the inclusion of the boundary layer can reduce the thermal stress generated on the interface between the external electrode and the ceramic layer and can further increase the bonding strength between the ceramic layer and the external electrode.

The external electrode may include an interface protrusion on at least a part of a surface of the boundary layer.

Preferably, the interface protrusion includes Ba, Ti, and Si as a main component, and the interface protrusion includes 0.35-0.45 parts by mol of Ba, 0.10-0.30 parts by mol of Ti, and 0.35-0.45 parts by mol of Si, provided that a total of Ba, Ti, and Si included in the interface protrusion is 1 part by mol.

Since Ba and Ti are contained in both of the boundary layer and the interface protrusion, the boundary layer and the interface protrusion are easily diffused to each other and are firmly bonded to each other. In addition, the interface protrusion containing Ba, Ti, and Si in a predetermined molar ratio has a comparatively low linear expansion coefficient. Since the interface protrusion is provided on the surface of the external electrode on the boundary layer side, the components constituting the external electrode tighten the interface protrusion with thermal stress during cooling in the baking. This is considered to make it possible to more firmly bond the ceramic layer and the external electrode and to further increase the bonding strength.

Preferably, the boundary layer has an average thickness of 2-20 μm.

When the average length of the boundary layer is within the above-mentioned range, the bonding strength can be further increased while ensuring the capacitance.

Preferably, the boundary layer is provided so as to contact with the internal electrode layer, and the internal electrode layer includes Ni or Ni alloy as a main component.

In the present invention, the boundary layer is provided so as to contact with the internal electrode layer, and a magnitude correlation between α, γ, and σ satisfies $\gamma > \sigma > \alpha$, where α is a linear expansion coefficient of the ceramic layer, γ is a linear expansion coefficient of the boundary layer, and σ is a linear expansion coefficient of the internal electrode layer. In such a correlation, the boundary layer having a linear expansion coefficient closer to that of the internal electrode layer are in contact with the internal electrode layer, and the effect of preventing the peeling of the ceramic layer and the internal electrode layer near the surface of the element body is enhanced.

To achieve the above object, a ceramic electronic device according to the second aspect of the present invention comprises:

an element body formed by laminating a ceramic layer and an internal electrode layer; and an external electrode electrically connected to at least one end of the internal electrode layer, wherein the element body includes a boundary layer at an end of the ceramic layer, a magnitude correlation between $\alpha$, $\beta$, and $\gamma$ satisfies $\beta > \gamma > \alpha$, where $\alpha$ is a linear expansion coefficient of the ceramic layer, $\beta$ is a linear expansion coefficient of the external electrode, and $\gamma$ is a linear expansion coefficient of the boundary layer.

Preferably, the external electrode includes an interface protrusion on at least a part of a surface of the boundary layer, and a magnitude correlation between $\alpha$, $\beta$, $\gamma$, and $\delta$ satisfies $\gamma > \gamma > \alpha > \delta$, where $\delta$ is a linear expansion coefficient of the interface protrusion.

Preferably, the boundary layer is provided so as to contact with the internal electrode layer, and a magnitude correlation between $\alpha$, $\gamma$, and $\sigma$ satisfies $\gamma > \sigma > \alpha$, where $\sigma$ is a linear expansion coefficient of the internal electrode layer.

BRIEF DESCRIPTION OF THE DRAWING(S)

DETAILED DESCRIPTION OF THE INVENTION

First Embodiment

Figure 1:
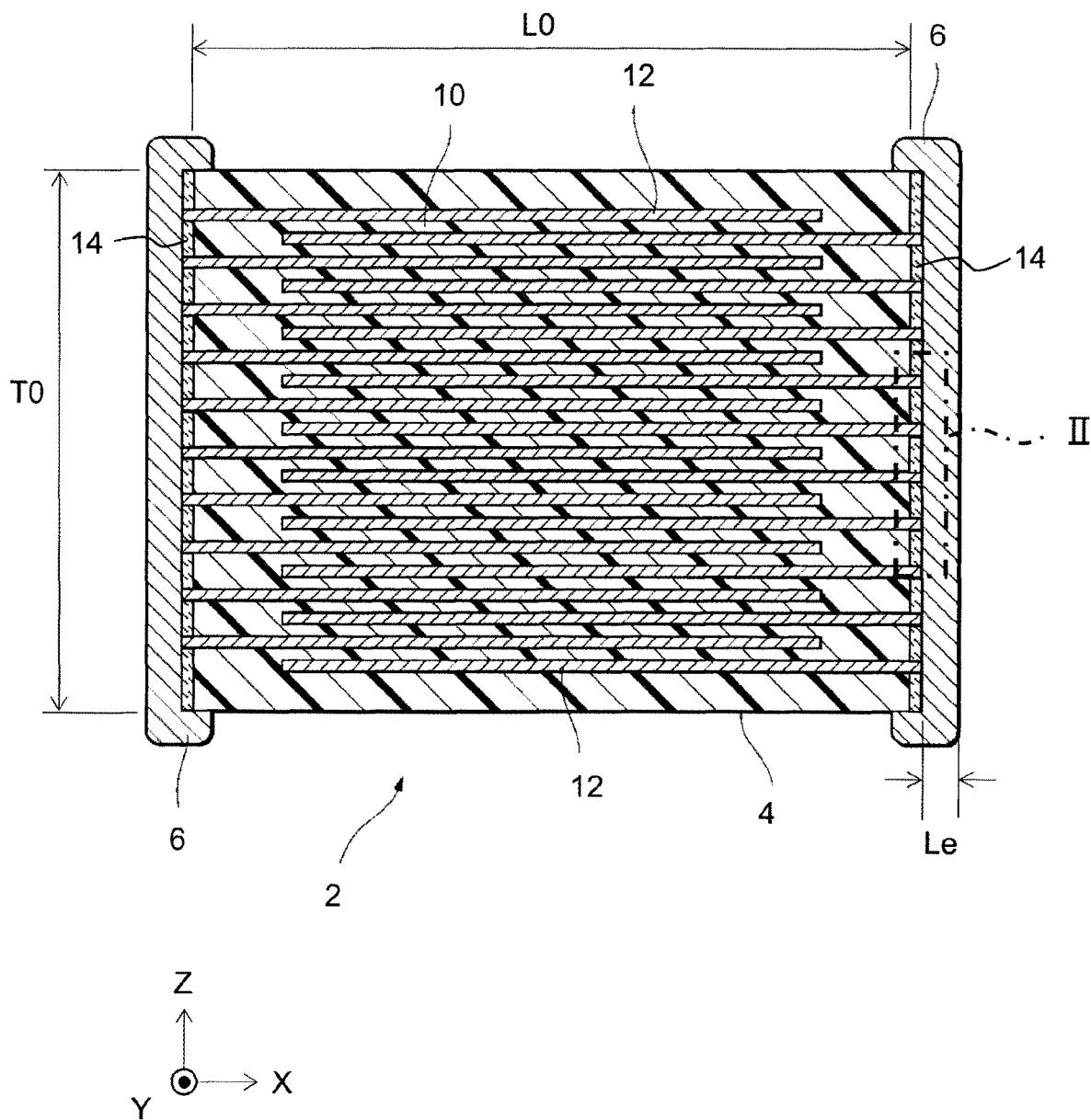
FIG. 1 is a schematic cross-sectional view of a multilayer ceramic capacitor according to an embodiment of the present invention.

As an embodiment of a ceramic electronic device according to the present invention, an overall configuration of a multilayer ceramic capacitor is described. FIG. 1 shows a cross-sectional view of a normal multilayer ceramic capacitor 2.

The multilayer ceramic capacitor 2 includes dielectric layers (ceramic layers) 10 and internal electrode layers 12 substantially parallel to a plane including the X-axis and the Y-axis and includes an element body 4 formed by alternately laminating the dielectric layers 10 and the internal electrode layers 12 along the Z-axis direction.

Here, "substantially parallel" means that most parts are parallel, but there may be a part that is not slightly parallel, and the dielectric layers 10 and the internal electrode layers 12 may slightly be uneven or inclined. In the present embodiment, the X-axis, the Y-axis, and the Z-axis are perpendicular to each other.

According to FIG. 1, the end surfaces of the element body 4 in the X-axis direction are flat surfaces. In other words, the dielectric layers 10 and the internal electrode layers 12 are laminated so as to be flush with each other. However, the end surfaces of the element body 4 in the X-axis direction may have a non-planar part. Moreover, the dielectric layers 10 and the internal electrode layers 12 may not be flush with each other and may be laminated, for example, in a state where the dielectric layers 10 are partly scraped off or the internal electrode layers 12 are partly protruding.

In the present embodiment, the alternately-laminated internal electrode layers 12 on one side are electrically connected to the inside of an external electrode 6 formed on the outside of one end of the element body 4 in the X-axis direction, and the alternately-laminated internal electrode layers 12 on the other side are electrically connected to the inside of an external electrode 6 formed on the outside of the other end of the element body 4 in the X-axis direction.

In the present embodiment, the element body 4 has any shape and size. The element body 4 may have an elliptical columnar shape, a columnar shape, a prismatic shape, or the like. For example, the element body 4 may have a length L0 of 0.4-5.7 mm in the X-axis direction. For example, the element body 4 may have a length W0 of 0.2-5.0 mm in the Y-axis direction. For example, the element body 4 may have a length T0 of 0.2-2.5 mm in the Z-axis direction.

Each of the dielectric layers 10 has any thickness. For example, each of the dielectric layers 10 sandwiched by the internal electrode layers 12 preferably has a thickness Td of 30 μm or less, more preferably has a thickness Td of 15 μm or less, and still more preferably has a thickness Td of 10 μm or less.

The lamination number of the dielectric layers 10 is not limited, but is preferably 20 or more and is more preferably 50 or more.

The material of the dielectric layers 10 is not limited. In the present embodiment, however, the dielectric layers 10 include a perovskite compound represented by $ABO_3$ as a main component.

The main component of the dielectric layers 10 is a component contained in the dielectric layers 10 by 90 mass % or more.

The perovskite compound represented by $ABO_3$ is represented by, for example, $(Ba_{1-a-b}Sr_aCa_b)_m(Ti_{1-c-d}Zr_cHf_d)O_3$ and may satisfy $0.94 < m < 1.1$, $0 \leq a \leq 1$, $0 \leq b \leq 1$, $0 \leq c \leq 1$, and $0 \leq d \leq 1$.

"m" indicates an elemental ratio of A-site and B-site. For example, $0.94 < m < 1.1$ is satisfied.

"a" indicates an elemental ratio of Sr. For example, $0 \leq a \leq 1$ is satisfied. Preferably, $0 \leq a < 1$ is satisfied. More preferably, $0 \leq a \leq 0.1$ is satisfied.

"b" indicates an elemental ratio of Ca. $0 \leq b \leq 1$ is satisfied. Preferably, $0 \leq b < 1$ is satisfied. More preferably, $0 \leq b \leq 0.1$ is satisfied.

"c" indicates an elemental ratio of Zr. $0 \leq c \leq 1$ is satisfied. Preferably, $0 \leq c < 1$ is satisfied. More preferably, $0 \leq c \leq 0.15$ is satisfied.

"d" indicates an elemental ratio of Hf. $0 \leq d \leq 1$ is satisfied. Preferably, $0 \leq d < 1$ is satisfied. More preferably, $0 \leq d \leq 0.05$ is satisfied.

The elemental ratio of oxygen (O) in the above-mentioned composition formula may slightly deviate from the stoichiometric composition.

In addition to the main component, the dielectric layers 10 according to the present embodiment may include sub-components, such as Mn compounds, Mg compounds, Cr compounds, Ni compounds, rare earth element compounds, Si compounds, Li compounds, B compounds, and V compounds. There is no limit to the type, combination, or addition amount of the sub-components.

Figure 2:
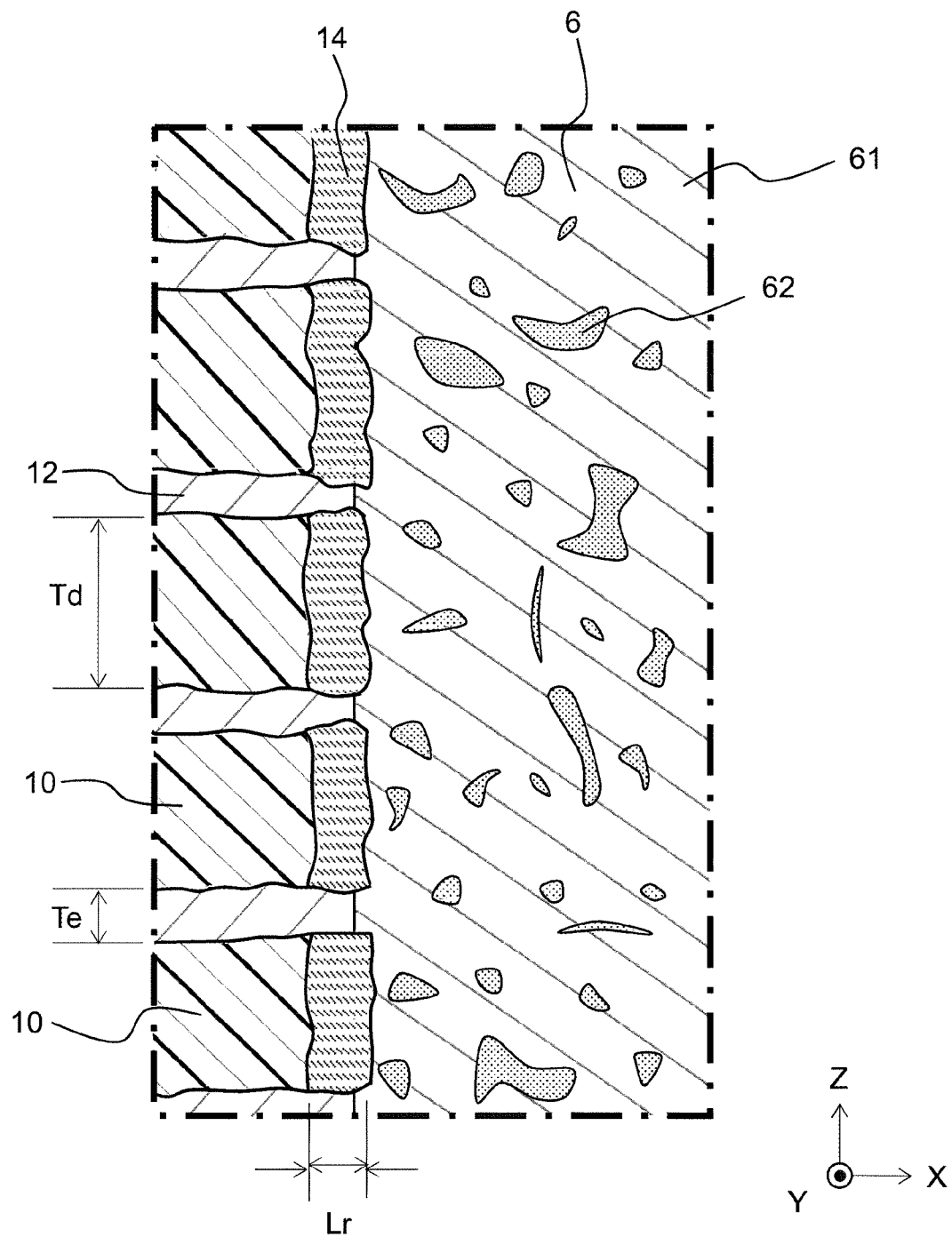
FIG. 2 is an enlarged view of the II part of FIG. 1.

FIG. 2 is an enlarged view of the II part of FIG. 1. As shown in FIG. 2, the element body 4 according to the present embodiment includes a boundary layer 14 at each end of the dielectric layers 10 in the X-axis direction. Each of the boundary layers 14 is provided so as to contact with the internal electrode layers 12.

Each of the boundary layers 14 intermittently covers the end surface of the element body 4 in the X-axis direction so that a conductor 61 of the external electrode 6 and the internal electrode layers 12 are connected. That is, each of the boundary layers 14 is partly disconnected at the connection points between the ends of the internal electrode layers 12 in the X-axis direction and the conductor 61.

The connection interface between each of the external electrodes 6 and the internal electrode layers 12 is not necessarily clear. Each of the external electrodes 6 may partly enter the boundary layer 14, The ends of the internal electrode layers 12 may enter each of the boundary layers 14.

When each of the external electrodes 6 is formed so as to extend from the end surface of the element body 4 in the X-axis direction to the end surface of the element body 4 in the Z-axis direction, each of the boundary layers 14 is preferably formed not only on the end surface in the X-axis direction, but on the end surface in the Z-axis direction.

When an X-Z cross section is observed, the point where each of the boundary layers 14 covers the ends of a part of the internal electrode layers 12 in the X-axis direction may exist near the end surface of the element body 4 in the X-axis direction. Each of the internal electrode layers 12 exists along not only the X-axis direction, but along the Y-axis direction. As long as the end of each of the internal electrode layers 12 even partly penetrates the boundary layer 14 in the Y-axis direction and is electrically conducted with the external electrode 6, each of the internal electrode layers 12 and the external electrode 6 can electrically be connected even if the ends of the internal electrode layers 12 are partly covered with the boundary layer 14.

Each of the boundary layers 14 according to the present embodiment includes Ba and Ti as a main component.

"Each of the boundary layers 14 includes Ba and Ti as a main component" means that the total of Ba and Ti occupies 90 parts by mol or more in each of the boundary layers 14, provided that the total of elements other than oxygen is 100 parts by mol.

In the present embodiment, when the total of Ba and Ti included in each of the boundary layers 14 is 1 part by mol, each of the boundary layers 14 preferably includes 0.27-0.40 parts by mol of Ba. In this case, each of the boundary layer 14 tends to have a linear expansion coefficient $\gamma$ of 13.0 ppm/° C. to 14.5 ppm/° C. In the present embodiment, more preferably, each of the boundary layers 14 is $BaTi_2O_5$.

Preferably, a magnitude correlation between $\alpha$, $\beta$, and $\gamma$ satisfies $\beta > \gamma > \alpha$, where $\alpha$ is a linear expansion coefficient of the dielectric layers 10, $\beta$ is a linear expansion coefficient of the external electrodes 6.

For example, the linear expansion coefficient $\alpha$ of $BaTiO_3$ (the main component of the dielectric layers 10) is 9.4 ppm/° C., the linear expansion coefficient $\beta$ of Cu used for the external electrodes 6 is 17.5 ppm/° C., and the linear expansion coefficient Y of $BaTi_2O_5$ constituting the boundary layers 14 is 13.3 ppm/° C.

Preferably, a magnitude correlation between $\alpha$, $\beta$, $\gamma$, and $\sigma$ satisfies $\beta > \gamma > \sigma > \alpha$, where $\sigma$ is a linear expansion coefficient of the internal electrode layers 12.

In addition to Ba and Ti, the boundary layers 14 may include elements constituting the ceramic layers 10, such as Si, Mg, Al, and B. When the boundary layers 14 include elements constituting the ceramic layers 10, the bonding strength of the boundary layers 14 with the ceramic layers 10 is considered to be further improved.

The elements constituting the ceramic layers 10 and contained in the boundary layers 14 may be contained intentionally in a boundary-layer paste or may be contained in the boundary layers 14 by being dispersed from the ceramic layers 10.

In addition to Ba and Ti, the boundary layers 14 may include elements constituting the external electrodes 6. When the boundary layers 14 include elements constituting the external electrodes 6, the bonding strength of the boundary layers 14 to the external electrodes 6 is considered to be further improved.

The elements constituting the external electrodes 6 and contained in the boundary layer 14 may be contained intentionally in a boundary-layer paste or may be contained in the boundary layers 14 by being dispersed from the external electrodes 6.

In addition to Ba and Ti, the boundary layers 14 may include elements constituting the internal electrode layers 12. When the boundary layers 14 include elements constituting the internal electrode layers 12, the bonding strength of the boundary layers 14 to the internal electrode layers 12 is considered to be further improved.

The elements constituting the internal electrode layers 12 and contained in the boundary layers 14 may be contained intentionally in a boundary-layer paste or may be contained in the boundary layers 14 by being dispersed from the internal electrode layers 12.

An average length Lr of each of the boundary layers 14 in the X-axis direction (an average thickness of each of the boundary layers 14) is preferably 1.8-20.2 μm, more preferably 2-20 μm, and still more preferably 3.1-16.2 μm.

The average length Lr of each of the boundary layers 14 in the X-axis direction is affected by a thickness of a boundary-layer paste applied to the element body 4, an inorganic content of a boundary-layer paste, a baking temperature of a boundary-layer paste, a holding time for a baking temperature of a boundary-layer paste, or the like. The higher the baking temperature of the boundary-layer paste is, the larger the average length Lr of each of the boundary layers 14 in the X-axis direction tends to be.

When the average length Lr of each of the boundary layers 14 is within the above-mentioned range, the bonding strength can be further increased while ensuring the capacitance.

The conductive material contained in the internal electrode layers 12 is not limited, but is preferably Ni, Ni based alloy, Cu, Cu based alloy, Ag, Ag based alloy, Pd, Pd-based alloy, or the like. The Ni, Ni based alloy, Cu, or Cu based alloy may contain various trace components, such as P, at about 0.1 mass % or less. In the present embodiment, the internal electrode layers 12 may contain Ni or Ni alloy as a main component. When Ni or Ni alloy is a main component, one or more sub-components selected from Mn, Cu. Cr, etc. may be contained.

The main component of the internal electrode layers 12 is a component occupying 90 mass % or more of the internal electrode layers 12.

The internal electrode layers 12 may be formed using a commercially available electrode paste. The thickness of each of the internal electrode layers 12 may be determined appropriately based on the intended use and the like. For example, each of the internal electrode layers 12 can have a thickness Te of 3.0 μm or less.

The external electrodes 6 according to the present embodiment are formed on the element body 4 so as to electrically be connected with at least a part of the internal electrode layers 12.

The surfaces of the external electrodes 6 may have plating or may have conductive resin and plating.

The component of the conductor 61 constituting the external electrodes 6 is not limited and is a known conductive material, such as Cu, Ag, and their alloy. In the present embodiment, the conductor 61 may include at least one of Cu, Cu alloys, Ag, and Ag alloys as a main component.

The main component of the conductor 61 is a component contained at 90 mass % or more in the conductor 61 excluding the coating layer by plating or the like.

When the conductor 61 includes Cu, elements such as Al, Ni, Ag, Pd, Sn, Zn, P, and Mn may be contained.

The thickness Le of each of the external electrodes 6 is not limited and is, for example, 10-200 μm.

In the present embodiment, the external electrodes 6 may include a non-metal component 62 and may include, for example, a glass containing $SiO_2$, a glass containing $B_2O_3$—$SiO_2$, etc.

The structure of the boundary layers 14 can be analyzed by cross-sectional observation using a scanning electron microscope (SEM), a scanning transmission electron microscope (STEM), or the like. The composition of the boundary layers 14 can be measured by performing a component analysis by electron probe microanalyzer (EPMA) at the time of cross-sectional observation. Preferably, the component analysis is performed at least at three points, and the composition of the boundary layers 14 is calculated from an average value of the measurement results. In the present embodiment, when the component analysis is performed by EPMA, energy dispersive spectroscope (EDS) or wavelength dispersive spectroscope (WDS) can be used as an X-ray spectroscope.

Next, a method of manufacturing the multilayer ceramic capacitor 1 shown in FIG. 1 is explained.

First, a dielectric-layer paste is prepared so as to manufacture green sheets to be constituting the dielectric layers 10 shown in FIG. 1 after firing.

The dielectric-layer paste is normally formed from an organic solvent based paste obtained by kneading a dielectric powder and an organic vehicle or from a water based paste.

A raw material of the dielectric powder is appropriately selected from various compounds to be composite oxides or oxides to be constituting the dielectric layers 10 mentioned above, such as carbonates, hydroxides, and organic metal compounds, and can be used by mixing them.

The organic vehicle is a binder dissolved in an organic solvent. The binder used for the organic vehicle is not limited and is appropriately selected from various normal binders, such as acrylic, ethyl cellulose, and butyral.

The organic solvent to be used is not limited and is appropriately selected from various organic solvents, such as alcohol, methyl ethyl ketone, acetone, toluene, tarpineol, and butyl carbitol, depending on the method to be used, such as the sheet method and the printing method.

If necessary, the dielectric-layer paste may contain additives selected from various dispersants, plasticizers, dielectrics, sub-component compounds, glass frit, and the like.

Examples of the plasticizers include phthalic esters, such as dioctyl phthalate and benzyl butyl phthalate, adipic acid, phosphoric acid esters, and glycols.

Next, an internal-electrode-layer paste for forming the internal electrode layers 12 shown in FIG. 1 is prepared. The internal-electrode-layer paste is prepared by kneading a conductive material made of the above-mentioned various conductive metals or alloys and the above-mentioned organic vehicle. Instead of the conductive material, oxides, organometallic compounds, or the like can also be used. The above-mentioned oxides and organometallic compounds become the above-mentioned conductive material after firing. If necessary, the internal-electrode-layer paste may contain a ceramic powder (e.g., barium titanate powder) as an inhibitor. The inhibitor has an effect of preventing the sintering of the conductive powder in the firing step.

Green sheets to be the dielectric layers 10 after firing and internal electrode pattern layers to be the internal electrode layers 12 after firing are laminated alternately as shown in FIG. 1 using the above-prepared dielectric-layer paste and internal-electrode-layer paste to manufacture a green laminated body to be the element body 4 after firing.

Specifically, first, green sheets are formed on carrier sheets (e.g., PET film) as supports by a doctor blade method or the like. The green sheets are dried after being formed on the carrier sheets.

Next, internal electrode pattern layers are formed on the surfaces of the above-formed green sheets using the internal-electrode-layer paste to obtain green sheets including the internal electrode pattern layers. Then, the green sheets including the obtained internal electrode pattern layers are alternately laminated to obtain a green laminated body.

The internal electrode pattern layers are formed by any method, such as printing method and transfer method. The green sheets including the internal electrode pattern layers may be laminated via adhesive layers.

The obtained green laminated body is cut into a predetermined size to obtain a green chip. The green chip may be solidified by removing the plasticizer by solidification drying. The green chip after solidification and drying may be put into a barrel container together with a media and a polishing liquid and subjected to barrel-polishing by a horizontal centrifugal barrel machine or the like. The green chip after barrel-polishing is washed with water and dried. Solidification drying and barrel polishing may not necessarily be performed.

The green chip after drying is subjected to a binder removal step, a firing step, and, if necessary, an annealing step. Then, the element body 4 shown in FIG. 1 is obtained.

As the binder removal conditions, the heating rate is preferably 5-300° C./hour, the holding time is preferably 180-400° C., and the temperature holding time is preferably 0.5-24 hours. The binder removal atmosphere is the air or a reducing atmosphere.

The holding temperature during firing is preferably 1200-1350° C. and is more preferably 1220-1300° C., and its holding time is preferably 0.5-8 hours and is more preferably 1-3 hours.

Preferably, the firing atmosphere is a reducing atmosphere. As the atmospheric gas, for example, a mixed gas of $N_2$ and $H_2$ can be humidified and used.

The oxygen partial pressure during firing is appropriately determined based on the type of the conductive material in the internal-electrode-layer paste, but when a base metal, such as Ni and Ni alloy, is used as the conductive material, the oxygen partial pressure in the firing atmosphere is preferably $10^{-14}$ to $10^{-10}$ MPa.

Preferably, the element body 4 is annealed after being fired in a reducing atmosphere. Annealing is a treatment for reoxidizing the dielectric layers 10. This makes it possible to remarkably extend the IR life (high-temperature load life), and the reliability is thereby improved.

Preferably, the oxygen partial pressure in an annealing atmosphere is $10^{-9}$ to $10^{-5}$ MPa. When the oxygen partial pressure is $10^{-9}$ MPa or more, it is easy to efficiently reoxidize the dielectric layers 10.

Preferably, the holding temperature during annealing is 950-1150° C. When the holding temperature is 950° C. or more, it is easy to sufficiently oxidize the dielectric layers 10, and it is easy to improve the insulation resistance (IR) and the IR life.

As the annealing conditions except for this, the temperature holding time is preferably 0-20 hours, and the cooling rate is preferably 50-500° C./hour. As the atmospheric gas for annealing, for example, a humidified $N_2$ gas is preferably used.

In the above-mentioned binder removal treatment, firing, and annealing, for example, a wetter is used to humidify the $N_2$ gas, the mixed gas, and the like. In this case, the water temperature is preferably about 5-75° C.

The binder removal treatment, the firing, and the annealing may be performed continuously or independently.

Next, the boundary layers 14 are formed by applying and baking a boundary-layer paste on both end surfaces of the element body 4 in the X-axis direction. This boundary layer paste is obtained by, for example, kneading a boundary-layer powder, a binder containing ethyl cellulose as a main component, and tarpineol as a dispersion medium with a mixer.

Here, the boundary layer powder is, for example, a combination of $TiO_2$ and $BaCO_3$, $BaTi_2O_5$, or the like.

The boundary-layer paste is applied to the element body 4 by any method, such as dipping, printing, coating, vapor deposition, and spraying.

After the element body 4 coated with the boundary-layer paste is dried, an external-electrode paste is applied and baked on both end surfaces of the element body 4 in the X-axis direction coated with the boundary-layer paste to form the external electrodes 6. Except for containing conductive material and glass constituting the external electrodes 6, the external-electrode paste is prepared similarly to the internal-electrode-layer paste mentioned above. The glass contained in the external-electrode paste is to exist in a region excluding the vicinity of the interface between the external electrode 6 and the boundary layer 14. Preferably, the glass contains $SiO_2$. More preferably, the glass contains $B_2O_3$—$SiO_2$.

The external electrodes 6 are baked with any conditions and are baked, for example, by being held at 800° C. to 1000° C. for 0.1 hours to 3 hours in a humidified $N_2$ or dried $N_2$ atmosphere.

Even in this case, the conductor 61 of the external electrodes 6 and the internal electrode layers 12 can electrically be conducted with each other. This is because $BaTi_2O_5$, $TiO_2$, or the like constituting the boundary layers 14 and $ABO_3$ constituting the dielectric layers 10 react with each other after the conductive material of the internal electrode layers 12 and the metal powder to be the conductor 61 react with each other, and it is thereby difficult to form oxides from the boundary-layer paste at the ends of the internal electrode layers 12 in the X-axis direction.

Then, if necessary, coating layers are formed on the surfaces of the external electrodes 6 by a conductive resin and/or plating or the like. For example, a conductive resin may be formed on the surface of the above-mentioned baked electrode containing Cu, Ni plating may be formed thereon, and Sn plating may be further formed thereon.

The multilayer ceramic capacitor 2 manufactured in such a manner is mounted on a printed circuit board or the like by soldering or the like and is used in various electronics and the like.

In the multilayer ceramic capacitor 2 according to the present embodiment, it is possible to effectively prevent the thermal stress generated on the interfaces between the external electrodes 6 and the dielectric layers 10 due to, for example, thermal shock during cooling in the baking, during manufacturing, during use, or the like. The reason is considered to be as follows.

In the present embodiment, the dielectric layers 10 include a perovskite compound represented by $ABO_3$ as a main component, and the element body 4 includes the boundary layers 14 containing Ba and Ti in a predetermined molar ratio at the ends of the dielectric layers 10. "A" of $ABO_3$ is a substitutable component of Ba, and "B" of $ABO_3$ is a substitutable component of Ti. Thus, it is considered that the dielectric layers 10 and the boundary layers 14 are easy to be diffused to each other, and that the dielectric layers 10 and the boundary layers 14 are firmly bonded to each other.

It is further considered that the Ti content is higher than the Ba content in the boundary layers 14, and the external electrodes 6 and the boundary layers 14 are thereby firmly bonded to each other. This effect is considered to be more remarkable by simultaneously baking the boundary-layer paste and the external-electrode paste.

In the present embodiment, since the external electrodes 6 and the boundary layers 14 are firmly bonded as well as the dielectric layers 10 and the boundary layers 14 are firmly bonded, the element body 4 and the external electrodes 6 are firmly bonded.

Since Ba and Ti are contained in both of the dielectric layers 10 and the boundary layers 14, Ba and Ti are easier to be diffused to each other, so that the dielectric layers 10 and the boundary layer 14 are more firmly bonded to each other.

Since the external electrodes 6 include at least one of Cu, Cu alloy, Ag, and Ag alloy as a main component, the linear expansion coefficient γ of the boundary layers 14 is smaller than the linear expansion coefficient β of the external electrodes 6 and larger than the linear expansion coefficient α of the dielectric layers 10. In the present embodiment, it is considered that the inclusion of the boundary layers 14 can reduce the thermal stress generated on the interfaces between the external electrodes 6 and the dielectric layers 10 and can further increase the bonding strength between the dielectric layers 10 and the external electrodes 6.

When the internal electrode layers 12 include Ni or Ni alloy as a main component, a magnitude correlation between α, γ, and σ satisfies γ>σ>α, where α is a linear expansion coefficient of the dielectric layers 10, γ is a linear expansion coefficient of the boundary layers 14, and σ is a linear expansion coefficient of the internal electrode layers 12. In the present embodiment, the boundary layers 14 are provided so as to contact with the internal electrode layers 12. Thus, the boundary layers 14 having a linear expansion coefficient closer to that of the internal electrode layers 12 are in contact with the internal electrode layers 12, and the effect of preventing the peeling of the dielectric layers 10 and the internal electrode layers 12 near the surface of the element body 4 is enhanced.

In the above, the green chip is fired to form the element body 4, and the boundary layers 14 are thereafter baked onto the element body 4, but the boundary layers 14 may be formed by applying the above-mentioned boundary-layer paste onto the green chip before firing and subjecting the above-mentioned boundary-layer paste to firing together with the green chip.

In the above, the boundary-layer paste and the external-electrode paste are baked simultaneously, but the external electrodes 6 may be formed after baking the boundary-layer paste.

In this case, both end surfaces of the element body 4 in the X-axis direction on which the boundary layers 14 are formed are subjected to an end-surface polishing by barrel polishing, sandblasting, laser, or the like. This removes the oxide from the boundary-layer paste formed on both end surfaces of the internal electrode layers 12 in the X-axis direction. After that, the external electrodes 6 are formed. The external electrodes 6 are formed by any appropriate method, such as coating and baking of the external-electrode paste, plating, vapor deposition, and sputtering.

In the above, the boundary-layer paste is used, but the boundary layers 14 may be formed by putting a Ti excess material into the external-electrode paste and baking the external-electrode paste without using the boundary-layer paste. The Ti excess material is a substance containing 0.27-0.40 parts by mol of Ba, provided that the total of Ba and Ti is 1 part by mol. For example, the Ti excess material may be $BaTi_2O_5$ or may be a mixture of two or more selected from $TiO_2$, $BaCO_3$, $BaTiO_3$, and $BaTi_2O_5$.

Second Embodiment

Except for the following respects, a multilayer ceramic capacitor according to the present embodiment is similar to the multilayer ceramic capacitor according to First Embodiment.

Figure 3:
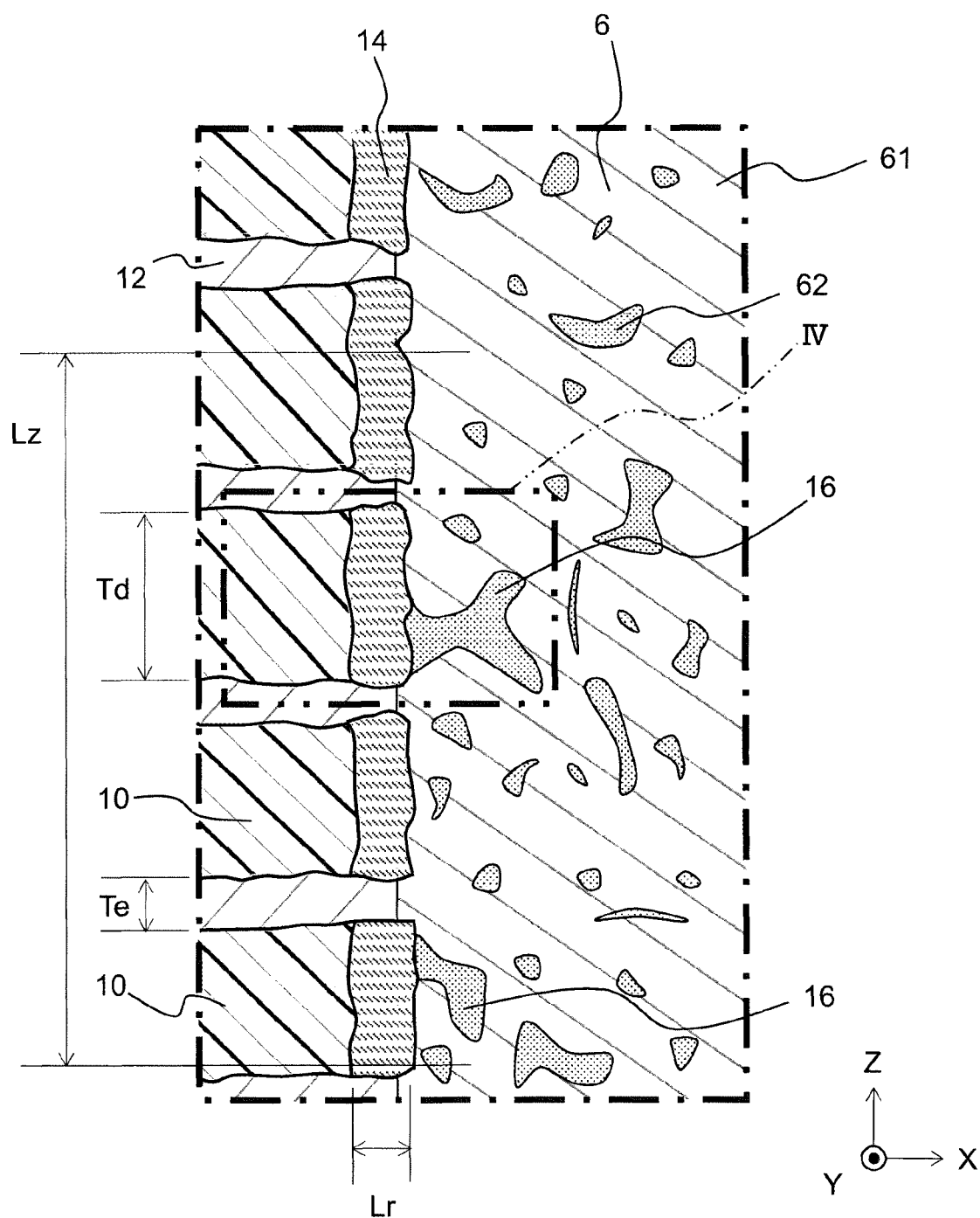
FIG. 3 is an enlarged view of a multilayer ceramic capacitor according to another embodiment of the present invention.

FIG. 3 is also an enlarged view of the II part of FIG. 1, but as shown in FIG. 3, the multilayer ceramic capacitor according to the present embodiment includes amorphous interface protrusions 16 connected to the boundary layer 14 formed at the ends of the dielectric layers 10 in the X-axis direction and formed by biting into the inside of the external electrode 6.

Preferably, each of the interface protrusions 16 according to the present embodiment has a shape that exhibits an anchor effect. The "shape that exhibits an anchor effect" means that the interface protrusions 16 do not spread thinly along the outer surface (Y-Z plane) of each of the boundary layers 14, but spread three-dimensionally from the outer surface of each of the boundary layers 14 toward the inside of each of the external electrodes 6 (i.e., outward in the X-axis direction) as shown in FIG. 3.

Figure 4:
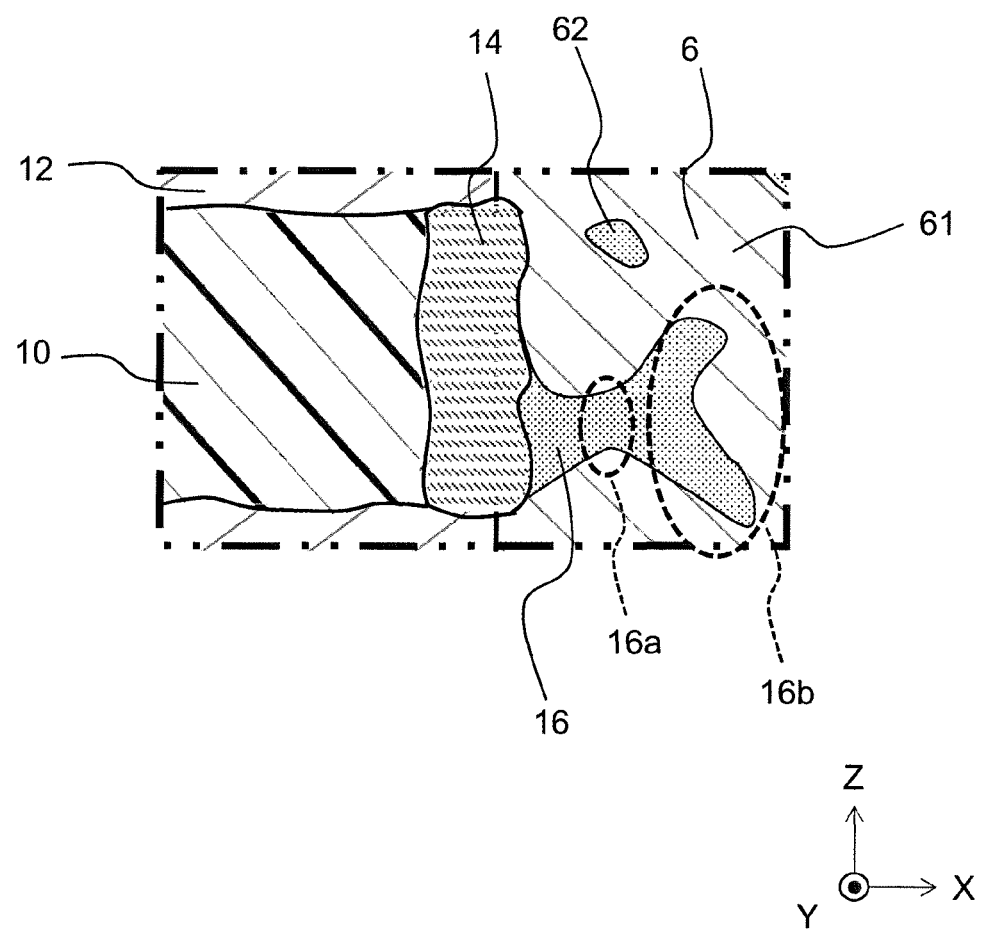
FIG. 4 is an enlarged view of the IV part of FIG. 3.

FIG. 4 is an enlarged view of the IV part of FIG. 3. As shown in FIG. 4, preferably, each of the interface protrusions 16 has a constriction in the X-axis direction. Specifically, each of the interface protrusions 16 includes: a narrow part 16a having a narrow width in the Z-axis direction; and a wide part 16b having a wide width in the Z-axis direction and located on the outside of each of the interface protrusions 16 continuing to the narrow part 16a in the X-axis direction. That is, the narrow part 16a is a constricted part. Such a shape can be achieved by, for example, controlling the shapes of interface-protrusion particles added to an interface-protrusion paste. Since the shapes of the interface protrusions 16 have the above-mentioned characteristics, the bonding strength of the external electrodes 6 to the element body 4 is further improved.

Preferably, a predetermined number or more of interface protrusions 16 are present in a predetermined length L in the Z-axis direction in the vicinity of the interface between the element body 4 and each of the external electrodes 6. Specifically, in a cross section including the vicinity of the interface between the element body 4 and each of the external electrodes 6 (X-Z cross section), 0.6 or more interface protrusions 16 are preferably present, and 2 or more interface protrusions 16 are more preferably present, when the predetermined length Lz is 100 μm. The upper limit of the number of interface protrusions 16 is not limited, but is preferably 20 or less from the viewpoint of ensuring the electrical connection between the internal electrode layers 12 and each of the external electrodes 6.

The predetermined length Lz is a distance between two points in the vicinity of the interface between the element body 4 and each of the external electrodes 6. Thus, when the interface between the element body 4 and each of the external electrodes 6 has irregularities, the predetermined length Lz is not the length of the irregularities, but is a distance between two points determined on the irregularities.

The interface protrusions 16 according to the present embodiment include Ba, Ti, and Si as a main component.

"The interface protrusions 16 include Ba, Ti, and Si as a main component" means that the total of Ba, Ti, and Si occupies 90 parts by mol or more in the interface protrusions 16, provided that the total of elements other than oxygen is 100 parts by mol.

In the present embodiment, preferably, the interface protrusions 16 include 0.35-0.45 parts by mol of Ba, provided that the total of Ba, Ti, and Si contained in the interface protrusions 16 is 1 part by mol.

In the present embodiment, preferably, the interface protrusions 16 include 0.10-0.30 parts by mol of Ti, provided that the total of Ba, Ti, and Si contained in the interface protrusions 16 is 1 part by mol.

In the present embodiment, preferably, the interface protrusions 16 include 0.35-0.45 parts by mol of Si, provided that the total of Ba, Ti, and Si contained in the interface protrusions 16 is 1 part by mol.

In the present embodiment, more preferably, the composition of the interface protrusions 16 is $Ba_2Ti(SiO_4)_2$.

Preferably, a magnitude correlation between $\alpha$, $\beta$, $\gamma$, and $\delta$ satisfies $\beta > \gamma > \alpha > \delta$, where $\delta$ is a linear expansion coefficient of the interface protrusions 16 according to the present embodiment.

For example, the linear expansion coefficient $\delta$ of $Ba_2Ti(SiO_4)_2$, which is a main component of the interface protrusions 16, is 5.9 ppm/° C.

In the present embodiment, a glass containing $SiO_2$ (preferably, $B_2O_3$—$SiO_2$) may exist in the external electrodes 6 other than the vicinity of the interface between the external electrode 6 and the boundary layer 14.

The structure of the interface protrusions 16 can be analyzed by cross-sectional observation by SEM, STEM, or the like. As with the boundary layers 14 mentioned above, the component analysis of the interface protrusions 16 can be performed by EPMA or the like.

The multilayer ceramic capacitor including the interface protrusions 16 according to the present embodiment is manufactured by any method and can be manufactured similarly to First Embodiment except for using an interface-protrusion paste containing a compound (interface-protrusion particles) constituting the interface protrusions 16 and a conductive material. The "interface-protrusion particles" are preferably a compound satisfying the above-mentioned composition of the interface protrusions 16 and are, for example, $Ba_2Ti(SiO_4)_2$.

The interface-protrusion paste is prepared similarly to the above-mentioned internal-electrode-layer paste except for containing at least a metal powder constituting the conductor 61 of the external electrodes 6 and the interface-protrusion particles.

In the present embodiment, for example, a boundary-layer paste is applied to the fired element body 4, an interface-protrusion paste is applied thereto, an external-electrode layer paste is applied thereto, and the boundary-layer paste, the interface-protrusion paste, and the external-electrode layer paste are baked at the same time. The baking temperature is not limited, but is 800-1000° C.

Even in this case, the conductor 61 of the external electrodes 6 and the internal electrode layers 12 can electrically be conducted with each other. This is because the internal electrode layers 12 are made of metal and the boundary layers 14 are oxides, the interface-protrusion particles (oxides) are difficult to get wet with the internal electrode layers 12 and are easy to get wet with the boundary layers 14, a large amount of the interface-protrusion particles gather in the boundary layers 14, and the interface-protrusion particles are thereby unlikely to hinder the conduction between the conductor 61 and the internal electrode layers 12. In addition, $Ba_2Ti(SiO_4)_2$ or the like constituting the interface protrusions 16, $BaTi_2O_5$ or the like constituting the boundary layers 14, and $ABO_3$ constituting the dielectric layers 10 react with each other after the conductive material of the internal electrode layers 12 and the metal powder to be the conductor 61 of the external electrodes 6 react with each other, and it is thereby difficult to form the oxide from the boundary-layer paste at the ends of the internal electrode layers 12 in the X-axis direction.

The glass contained in the external-electrode layer paste becomes a glass existing in the external electrodes 6 other than the vicinity of the interface between the external electrode 6 and the boundary layer 14.

Since Ba and Ti are contained in both of the boundary layers 14 and the interface protrusions 16, Ba and Ti are easily diffused to each other, so that the boundary layers 14 and the interface protrusions 16 are firmly bonded to each other. This effect is considered to more remarkably appear by simultaneously baking the boundary-layer paste and the interface-protrusion paste.

The interface protrusions 16 containing Ba, Ti, and Si in a predetermined molar ratio has a comparatively low linear expansion coefficient. Since the interface protrusions 16 are provided on the surface of the external electrode 6 on the boundary layer 14 side, the components constituting the external electrodes 6 tighten the interface protrusions 16 with thermal stress during cooling in the baking. This is considered to make it possible to more firmly bond the dielectric layers 10 and the external electrodes 6 and to further increase the bonding strength.

In addition, since the glass containing $SiO_2$ or the like exists in the external electrodes 6 other than the vicinity of the interface between the external electrode 6 and the boundary layer 14, it is possible to prevent the composition deviation of the interface protrusions 16 composed of $Ba_2Ti(SiO_4)_2$ or the like.

In the present embodiment, the boundary-layer paste, the interface-protrusion paste, and the external-electrode paste are baked at the same time, but the external electrodes 6 may be formed with the external-electrode paste or the like after baking the boundary-layer paste and the interface-protrusion paste.

The external electrodes 6 may be formed with the external-electrode paste or the like by electrically conducting the internal electrode layers 12 and the external electrodes 6 with barrel polishing after baking the boundary-layer paste and thereafter baking the boundary-layer paste and the interface-protrusion paste.

The present invention is not limited to the above-mentioned embodiments and can be modified variously within the scope of the present invention.

For example, the ceramic electronic device of the present invention is applicable not only to a multilayer ceramic capacitor, but also to other ceramic electronic devices. Other ceramic electronic devices include all electronic devices having a ceramic layer and an external electrode, such as disk-shaped capacitors, bandpass filters, three-terminal filters, and piezoelectric element thermistors.

In the present embodiment, the dielectric layers 10 and the internal electrode layers 12 are laminated in the Z-axis direction, but the lamination direction may be the X-axis direction or the Y-axis direction. In that case, the external electrodes 6 are formed according to the exposed surfaces of the internal electrode layers 12. The element body 4 is not necessarily a laminated body and may be a single layer. The internal electrode layers 12 may be drawn out to the outer surface of the element body 4 via through-hole electrodes. In this case, the through-hole electrodes and the external electrodes 6 are electrically connected to each other.

EXAMPLES

Hereinafter, the present invention is explained in more detail with examples of the present invention, but the present invention is not limited to the examples.

<Sample No. 1>

A $BaTiO_3$ powder was prepared as a main raw material for a dielectric powder. Next, for 100 parts by mol of the main raw material, 1.6 parts by mol of a $MgCO_3$ powder were weighed, 1.0 part by mol of a $Dy_2O_3$ powder was weighed, 0.4 parts by mol of a $MnCO_3$ powder was weighed, and 0.06 parts by mol of a $V_2O_5$ powder was weighed, and 2.0 parts by mol a $SiO_2$ powder was weighed as sub-components. The powders of the sub-components were mixed in wet manner, dried, and calcined with a ball mill to obtain a sub-component calcined powder.

Next, the main raw material of the dielectric powder: 100 parts by mass, the sub-component calcined powder obtained above, acrylic resin: 7 parts by mass, butyl benzyl phthalate (BBP) as a plasticizer: 4 parts by mass, and methyl ethyl ketone as a solvent: 80 parts by mass were mixed with a ball mill and turned into paste to obtain a dielectric-layer paste.

Apart from the above, Ni particles: 56 parts by mass, tarpineol: 40 parts by mass, ethyl cellulose (molecular weight: 140,000): 4 parts by mass, and benzotriazole: 1 part by mass were kneaded with a triple-roll mill and turned into paste to form an internal-electrode-layer paste.

Then, green sheets were formed on PET films using the above-prepared dielectric-layer paste. Green sheets were formed by subjecting the internal-electrode-layer paste to screen printing.

The green sheets were laminated and bonded with pressure to obtain a green laminated body, and the green laminated body was cut into a predetermined size to obtain green chips.

Next, the obtained green chips were subjected to binder removal treatment, firing, and annealing with the following conditions to obtain a sintered body (element body 4).

The conditions for the binder removal treatment were holding temperature: 260° C. and atmosphere: air.

The firing condition was holding temperature: 1250° C. The atmospheric gas was a humidified $N_2+H_2$ mixed gas, and the oxygen partial pressure was set to $10^{-9}$ MPa or less.

The annealing conditions were holding temperature: 1050° C. and atmospheric gas: humidified $N_2$ gas (oxygen partial pressure: 10 MPa or less).

A wetter was used to humidify the atmospheric gas during firing and annealing.

Next, a boundary-layer powder was prepared by selecting from $TiO_2$, $BaTi_2O_5$, $BaTi_3O_7$, $BaTi_4O_9$, and $BaTiO_3$ so that the Ba content and the Ti content shown in "Boundary Layer" of Table 1 would be obtained.

The boundary-layer powder, a binder containing ethyl cellulose as a main component, and tarpineol and acetone as dispersion media were kneaded with a mixer to prepare a boundary-layer paste.

The boundary-layer paste was applied to both end surfaces of the element body 4 in the X-axis direction by a dipping method and dried.

Next, compounds having the Ba content, the Ti content, and the Si content shown in "Interface Protrusion" of Table 1 were prepared and used as interface-protrusion particles.

An interface-protrusion paste containing the interface-protrusion particles and Cu particles was prepared.

The interface-protrusion paste was applied so as to cover the dried boundary-layer paste on both end surfaces of the element body 4 in the X-axis direction and baked at 800° C.

Next, an external-electrode paste including glass particles containing $B_2O$—$SiO_2$ and Cu particles was prepared.

The external-electrode paste was applied by a dipping method to both end surfaces of the element body 4 in the X-axis direction, where the interface-protrusion paste was baked, and baked at 800° C. A capacitor sample 2 (multilayer ceramic capacitor 2) with the external electrodes 6 was obtained in such a manner.

The size of the element body 4 of the obtained capacitor sample 2 was L0×W0×T0=2.0 mm×1.25 mm×1.25 mm. The number of dielectric layers 10 sandwiched by the internal electrode layers 12 was 80.

The obtained capacitor sample was cut in parallel to the X-Z plane, and the obtained cross section was subjected to mirror polishing and then photographed by SEM. An elemental analysis by EPMA was carried out for the boundary layers 14 and the interface protrusions 16 in the cross section of the obtained multilayer ceramic capacitor. As a result, it was confirmed that the elemental composition of the boundary-layer powder and the elemental composition of the boundary layers 14 were substantially the same, and that the elemental composition of the interface-protrusion particles and the elemental composition of the interface protrusions 16 were substantially the same. The SEM observation and the elemental analysis by EPMA confirmed that, in sample No. 1, the boundary layers 14 were formed at the ends of the dielectric layers 10 in the X-axis direction, and that seven interface protrusions 16 were formed on average per 100 μm length (predetermined length Lz) on the surfaces of the external electrodes 6 on the boundary layer 14 side.

The average number of interface protrusions 16 was calculated by the following method. That is, in a cross section (X-Z cross section) including the vicinity of the interfaces between the element body 4 and the external electrodes 6, 10 photographs were taken so as to include a predetermined length Lz (100 μm), and the number of interface protrusions 16 per the predetermined length Lz in each of the photographs was counted to obtain an average value.

The thickness of the dielectric layer 10 sandwiched by the internal electrode layers 12, the thickness of each of the internal electrode layers 12, the length of the boundary layer 14, and the thickness of the external electrode 6 were measured. Each of them was measured at 10 points to calculate each average. The results were as follows.

Average Thickness Td of Dielectric Layers 10 Sandwiched by Internal Electrode Layers 12: 10 μm Average Thickness Te of Internal Electrode Layers 12: 1.5 μm Average Length Lr of Boundary Layers 14: 8.2 μm Average Length Le of External Electrodes 6: 89 μm For the obtained capacitor sample 2, a linear expansion coefficient α of the dielectric layers 10, a linear expansion coefficient β of the external electrodes 6, a linear expansion coefficient γ of the boundary layers 14, a linear expansion coefficient δ of the interface protrusions 16, and a linear expansion coefficient α of the internal electrode layers 12 were obtained in the following manner, and a tensile strength test and a 85° C. thermal shock tensile strength test were carried out in the following manner.

Linear Expansion Coefficient

For $BaTiO_3$ and $(Ba_{0.97}Ca_{0.03})TiO_3$, the linear expansion coefficient α was 9.4 ppm/° C., the linear expansion coefficient β was 17.5 ppm/° C., and the linear expansion coefficient γ was 12.5 ppm/® C. The linear expansion coefficient γ and the linear expansion coefficient S were measured from values in the range of 20-400° C. in the air by thermomechanical analysis (TMA) after preparing a sintered body according to the composition. Table 1 shows the magnitude correlation.

Tensile Strength Test

As the tensile strength test, an axial-lead tensile test was carried out. Specifically, each of the external electrodes 6 of the capacitor sample 2 was bonded with a lead wire using Sn—Ag—Cu solder, and the capacitor sample 2 and the lead wires were ultrasonically cleaned with thinner. One lead wire was fixed to a test table, and the other lead wire was gradually pulled at a speed of 10 mm/min using a load cell of 200 N. The force when at least one external electrode 6 was peeled off from the element body 4 was measured and considered to be a tensile strength. The test was carried out for 10 capacitor samples. The average values are shown in Table 1.

85° C. Thermal Shock Tensile Strength Test

As a thermal shock, prepared was a capacitor sample 2 in which 30-minute holding in air tank at −55° C. and 30-minute holding in air tank at 85° C. were repeated by 100 cycles. This capacitor sample 2 was subjected to a test similar to the above-mentioned tensile strength test, and the force when at least one external electrode 6 was peeled off from the element body 4 was measured and considered to be a 85° C. thermal shock tensile strength. The test was performed for 10 capacitor samples. The average values are shown in Table 1.

<Sample No. 2>

In Sample No. 2, a capacitor sample 2 was obtained similarly to Sample No. 1 except that the external electrodes 6 were formed by applying the boundary-layer paste to the element body 4 and thereafter applying and baking the external-electrode paste, and a tensile strength test and a 85° C. thermal shock tensile strength test were carried out. The results are shown in Table 1.

<Sample No. 3>

In Sample No. 3, a capacitor sample was obtained similarly to Sample No. 1 except that the external electrodes 6 were formed by applying and baking the external-electrode paste without applying the boundary-layer paste to the element body 4, and a tensile strength test and a 85° C. thermal shock tensile strength test were carried out. The results are shown in Table 1.

<Sample No. 4>

In Sample No. 4, a capacitor sample 2 was obtained similarly to Sample No. 1 except for using a $(Ba_{0.97}Ca_{0.03})$ TiO₃ powder, not the BaTiO₃ power, as a main raw material of the dielectric powder, and a tensile strength test and a 85° C. thermal shock tensile strength test were carried out. The results are shown in Table 1.

TABLE 1

| Sample No. | Ceramic Layers Composition of Main Component | Boundary Layers Each Element Content to Total of Ba and Ti (1 part by mol) [parts by mol] Ba | Boundary Layers Each Element Content to Total of Ba and Ti (1 part by mol) [parts by mol] Ti | Interface Protrusions Each Element Content to Total of Ba, Ti, and Si (1 part by mol) [parts by mol] Ba | Interface Protrusions Each Element Content to Total of Ba, Ti, and Si (1 part by mol) [parts by mol] Ti | Interface Protrusions Each Element Content to Total of Ba, Ti, and Si (1 part by mol) [parts by mol] S | Satisfaction of $\beta > \gamma > \alpha$ | Satisfaction of $\beta > \gamma > \alpha > \delta$ | Satisfaction of $\gamma > \sigma > \alpha$ | Tensile Strength [N] | 85° C. Thermal Shock Tensile Strength [N] |
|---|---|---|---|---|---|---|---|---|---|---|---|
| 3 | BaTiO₃ | N/A | N/A | N/A | N/A | | No | No | No | 5.3 | 5.1 |
| 2 | BaTiO₃ | 0.29 | 0.71 | N/A | N/A | | Yes | No | Yes | 21.1 | 6.7 |
| 1 | BaTiO₃ | 0.35 | 0.65 | 0.41 | 0.18 | 0.41 | Yes | Yes | Yes | 20.7 | 14.0 |
| 4 | $(Ba_{0.97}Ca_{0.03})TiO_3$ | 0.33 | 0.67 | 0.4 | 0.2 | 0.4 | Yes | Yes | Yes | 21.0 | 11.7 |

According to Sample Nos. 1-4, the tensile strength and the 85° C. thermal shock tensile strength when the boundary layers 14 were provided (Sample Nos. 1, 2, and 4) were higher than those when the boundary layers 14 were not provided (Sample No. 3).

According to Sample Nos. 1, 2, and 4, the tensile strength and the 85° C. thermal shock tensile strength when the interface protrusions 16 were provided (Sample Nos. 1 and 4) were higher than those when the interface protrusions 16 were not provided (Sample No. 2).

<Sample No. 11>

In Sample No. 11, a capacitor sample 2 was obtained and subjected to a tensile strength test similarly to Sample No. 2 except for applying a boundary-layer paste onto the ends of green chips before firing in the X-axis direction to form the boundary layers 14 at the same time as the firing of the element body 4 and applying an external-electrode paste after barrel polishing to form the external electrodes 6. The results are shown in Table 2.

<Sample No. 12>

In Sample No. 12, a capacitor sample 2 was obtained and subjected to a tensile strength test similarly to Sample No. 2 except for applying a boundary-layer paste to the element body 4, baking the boundary-layer paste, subjecting the boundary-layer paste to barrel polishing, and thereafter applying and baking an external-electrode paste. The results are shown in Table 2.

<Sample No. 13>

In Sample No. 13, a capacitor sample was obtained and subjected to a tensile strength test similarly to Sample No. 2 except that an external-electrode paste containing a Ti excess material and Cu particles was applied and baked without applying a boundary-layer paste to the element body 4. The results are shown in Table 2. The Ti excess material was $BaTi_2O_5$.

TABLE 2

| Sample No. | Composition of Main Component of Ceramic Layers | Timing of Applying Boundary-Layer Paste | Timing of Baking Boundary Layers | Note | Satisfaction of $\beta > \gamma > \alpha$ | Satisfaction of $\gamma > \sigma > \alpha$ | Tensile Strength [N] |
|---|---|---|---|---|---|---|---|
| 11 | BaTiO₃ | before firing element body | Same time as firing element body | | Yes | Yes | 18.2 |
| 12 | BaTiO₃ | after firing element body | before applying external-electrode paste | | Yes | Yes | 21.3 |
| 2 | BaTiO₃ | after firing element body | at the time of baking external electrodes | | Yes | Yes | 21.1 |
| 13 | BaTiO₃ | | | boundary layers were formed by putting Ti excess material into external-electrode paste | Yes | Yes | 18.5 |

According to Table 2, the boundary layers 14 were formed by different methods in Sample Nos. 11, 12, 2, and 13, but the tensile strength was high in any of Sample Nos. 11, 12, 2, and 13.

<Sample No. 1>

In Sample No. 1, the capacitor sample 2 obtained in the above-mentioned manner was subjected to a 125° C. thermal shock tensile strength test in the following manner.

125° C. Thermal Shock Tensile Strength Test

As a thermal shock, prepared was a capacitor sample in which 30-minute holding in air tank at −0.55° C. and 30-minute holding in air tank at 125° C. were repeated by RX) cycles. This capacitor sample was subjected to a test similar to the above-mentioned tensile strength test, and the force when at least one external electrode 6 was peeled off from the element body 4 was measured and considered to be a 125° C. thermal shock tensile strength. The test was performed for 10 capacitor samples. The average values are shown in Table 4.

<Sample No. 21>

In Sample No. 21, a capacitor sample 2 was obtained similarly to Sample No. 1 except for applying and drying an interface-protrusion paste and thereafter applying and baking an external-electrode paste, not baking an interface-protrusion paste immediately after applying it, and a tensile strength test, a 85° C. thermal shock tensile strength test, and a 125° C. thermal shock tensile strength test were carried out. The results are shown in Table 4.

<Sample No. 22>

A boundary layer paste was baked at 800° C. and subjected to barrel polishing, and an interface-protrusion paste was applied and dried. Before baking the interface-protrusion paste, an external-electrode paste was applied on the interface-protrusion paste, and the interface-protrusion paste and the external-electrode paste were baked at the same time. Except for the above, a capacitor sample 2 was obtained similarly to Sample No. 1, and a tensile test, a 85° C. thermal shock tensile strength test, and a 125° C. thermal shock tensile strength test were carried out. The results are shown in Table 4.

TABLE 3

| Sample No. | Composition of Main Component of Ceramic Layers | Timing of Applying Boundary-Layer Paste | Timing of Applying Interface-Protrusion Paste | Timing of Applying External-Electrode Paste | Note |
|---|---|---|---|---|---|
| 21 | BaTiO$_3$ | after firing element body | after applying and drying boundary-layer paste | after applying and drying interface-protrusion paste | |
| 1 | BaTiO$_3$ | after firing element body | aftter applying and drying boundary-layer paste | after baking interface protrusion | |
| 22 | BaTiO$_3$ | after firing element body | after baking boundary layers | after applying and drying interface-protrusion paste | |

TABLE 4

| Sample No. | Satisfaction of $\beta > \gamma > \alpha$ | Satisfaction of $\beta > \gamma > \alpha > \delta$ | Satisfaction of $\gamma > \sigma > \alpha$ | Tensile Strength [N] | 85° C. Thermal Shock Tensile Strength [N] | 125° C. Thermal Shock Tensile Strength [N] |
|---|---|---|---|---|---|---|
| 21 | Yes | Yes | Yes | 22.9 | 13.8 | 11.9 |
| 1 | Yes | Yes | Yes | 20.7 | 14.0 | 7.6 |
| 22 | Yes | Yes | Yes | 22.9 | 13.7 | 5.4 |

According to Table 3 and Table 4, the boundary layers 14 and the interface protrusions 16 were formed by different methods in Sample Nos. 21, 1, and 22, but the tensile strength and the 85° C. thermal shock tensile strength were high in any of Sample Nos. 21, 1, and 22.

According to Table 3 and Table 4, the 125° C. thermal shock tensile strength in Sample Nos. 21 and 1 (the boundary layer paste and the interface-protrusion paste were baked at the same time) was higher than that in Sample No. 22. This is probably because, in Sample Nos. 21 and 1, Ba and Ti were diffused to each other between the boundary layer paste and the interface-protrusion paste so as to strengthen the bonding by simultaneously baking the boundary layer paste and the interface-protrusion paste. According to Table 3 and Table 4, the 125° C. thermal shock tensile strength in Sample No. 21 (the boundary layer paste, the interface-protrusion paste, and the external-electrode paste were baked at the same time) was higher than that in Sample Nos. 1 and 22. This is probably because, in Sample No. 21, since the interface-protrusion paste and the external-electrode paste were baked at the same time, the composition deviation of the compound for forming the interface protrusions 16 contained in the interface-protrusion paste was prevented due to the presence of Si derived from the glass contained in the external-electrode paste so as to obtain the interface protrusions 16 satisfying a desired composition, and the bonding strength was thereby increased.

<Sample Nos. 31-34>

In Sample Nos. 31-34, a capacitor sample 2 was obtained and subjected to a tensile strength test similarly to Sample No. 2 except for changing the amount of Ba and Ti constituting the boundary layers 14 as shown in Table 5. The results are shown in Table 5.

TABLE 5

| Sample No. | Ceramic Layers Composition of Main Component | Boundary Layers Each Element Content to Total of Ba and Ti (1 part by mol) [parts by mol] | | Interface Protrusions Each Element Content to Total of Ba, Ti, and Si (1 part by mol) [parts by mol] | | | Satisfaction of $\beta > \gamma > \alpha$ | Satisfaction of $\gamma > \sigma > \alpha$ | Tensile Strength [N] |
|---|---|---|---|---|---|---|---|---|---|
| | | Ba | Ti | Ba | Ti | Si | | | |
| 31 | BaTiO$_3$ | 0.43 | 0.57 | N/A | | | No | Yes | 5.1 |
| 32 | BaTiO$_3$ | 0.40 | 0.60 | N/A | | | Yes | Yes | 22.7 |
| 2 | BaTiO$_3$ | 0.29 | 0.71 | N/A | | | Yes | Yes | 21.1 |
| 33 | BaTiO$_3$ | 0.27 | 0.73 | N/A | | | Yes | Yes | 21.5 |
| 34 | BaTiO$_3$ | 0.26 | 0.74 | N/A | | | No | Yes | 6.5 |

According to Table 5, the tensile strength when the Ba content was 0.27-0.4 provided that the total of Ba and Ti contained in the boundary layers 14 was 1 mol (Sample Nos. 32, 2, and 33) was higher than that when the Ba content was 0.43 (Sample No. 31) and when the Ba content was 0.26 (Sample No. 34) provided that the total of Ba and Ti contained in the boundary layers 14 was 1 mol.

<Sample Nos. 41-52>

In Sample Nos. 41-52, a capacitor sample was obtained and subjected to a tensile strength test and a 85° C. thermal shock tensile strength test similarly to Sample No. 1 except for changing the amount of Ba, Ti, and Si constituting the interface protrusions 16 as shown in Table 6. The results are shown in Table 6.

TABLE 6

| Sample No. | Ceramic Layers Composition of Main Component | Boundary Layers Each Element Content to Total of Ba and Ti (1 part by mol) [parts by mol] | | Interface Protrusions Each Element Content to Total of Ba, Ti, and Si (1 part by mol) [parts by mol] | | | Satisfaction of $\beta > \gamma > \alpha$ | Satisfaction of $\beta > \gamma > \alpha > \delta$ | Satisfaction of $\gamma > \sigma > \alpha$ | Tensile Strength [N] | 85° C. Thermal Shock Tensile Strength [N] |
|---|---|---|---|---|---|---|---|---|---|---|---|
| | | Ba | Ti | Ba | Ti | Si | | | | | |
| 45 | BaTiO$_3$ | 0.35 | 0.65 | 0.45 | 0.11 | 0.44 | Yes | Yes | Yes | 21.8 | 14.8 |
| 42 | BaTiO$_3$ | 0.35 | 0.65 | 0.35 | 0.27 | 0.38 | Yes | Yes | Yes | 22.3 | 11.8 |
| 1 | BaTiO$_3$ | 0.35 | 0.65 | 0.41 | 0.18 | 0.41 | Yes | Yes | Yes | 20.7 | 14.0 |
| 43 | BaTiO$_3$ | 0.37 | 0.63 | 0.35 | 0.30 | 0.35 | Yes | Yes | Yes | 20.4 | 12.6 |
| 44 | BaTiO$_3$ | 0.33 | 0.67 | 0.45 | 0.10 | 0.45 | Yes | Yes | Yes | 22.8 | 14.0 |
| 45 | BaTiO$_3$ | 0.29 | 0.71 | 0.41 | 0.14 | 0.45 | Yes | Yes | Yes | 22.8 | 13.4 |
| 46 | BaTiO$_3$ | 0.31 | 0.69 | 0.43 | 0.22 | 0.35 | Yes | Yes | Yes | 21.5 | 13.2 |
| 47 | BaTiO$_3$ | 0.35 | 0.65 | 0.33 | 0.25 | 0.42 | Yes | No | Yes | 20.1 | 7.3 |
| 48 | BaTiO$_3$ | 0.38 | 0.62 | 0.47 | 0.17 | 0.36 | Yes | No | Yes | 22.2 | 5.1 |
| 49 | BaTiO$_3$ | 0.30 | 0.70 | 0.46 | 0.08 | 0.46 | Yes | No | Yes | 20.5 | 7.4 |
| 50 | BaTiO$_3$ | 0.31 | 0.69 | 0.34 | 0.32 | 0.34 | Yes | No | Yes | 21.0 | 7.6 |
| 51 | BaTiO$_3$ | 0.32 | 0.68 | 0.37 | 0.30 | 0.33 | Yes | No | Yes | 22.1 | 5.7 |
| 52 | BaTiO$_3$ | 0.29 | 0.71 | 0.40 | 0.13 | 0.47 | Yes | No | Yes | 22.1 | 7.1 |

According to Table 6, when the interface protrusions 16 had a Ba content of 0.35-0.45 mol, a Ti content of 0.10-0.30 mol, and a Si content of 0.35-0.45 mol provided that the total of Ba, Ti, and Si contained in the interface protrusions 16 was 1 mol (Sample Nos. 41, 42, 1, and 43-46), the 85° C. thermal shock tensile strength was higher than that in the other samples (Sample Nos. 47-52).

<Sample Nos. 61-64>

In Sample Nos. 61-64, a capacitor sample 2 was obtained and subjected to a tensile strength test similarly to Sample No. 1 except for changing the application thickness of a boundary-layer paste. The results are shown in Table 7.

TABLE 7

| Sample No. | Ceramic Layers Composition of Main Component | Boundary Layers | | | Interface Protrusions | | | Satisfaction of $\beta > \gamma > \alpha$ | Satisfaction of $\beta > \gamma > \alpha > \delta$ | Satisfaction of $\gamma > \sigma > \alpha$ | Tensile Strength [N] |
|---|---|---|---|---|---|---|---|---|---|---|---|
| | | Each Element Content to Total of Ba and Ti (1 part by mol) [parts by mol] | | Average Length Lr [μm] | Each Element Content to Total of Ba, Ti, and Si (1 part by mol) [parts by mol] | | | | | | |
| | | Ba | Ti | | Ba | Ti | Si | | | | |
| 61 | BaTiO$_3$ | 0.35 | 0.65 | 1.8 | 0.41 | 0.18 | 0.41 | Yes | Yes | Yes | 14.7 |
| 62 | BaTiO$_3$ | 0.33 | 0.67 | 3.1 | 0.41 | 0.19 | 0.41 | Yes | Yes | Yes | 19.1 |
| 1 | BaTiO$_3$ | 0.35 | 0.65 | 8.2 | 0.41 | 0.18 | 0.41 | Yes | Yes | Yes | 20.7 |
| 63 | BaTiO$_3$ | 0.35 | 0.65 | 16.2 | 0.39 | 0.22 | 0.39 | Yes | Yes | Yes | 15.2 |
| 64 | BaTiO$_3$ | 0.35 | 0.65 | 20.2 | 0.41 | 0.18 | 0.41 | Yes | Yes | Yes | 13.1 |

According to Table 7, when the boundary layers 14 had an average length Lr of more than 1.8 μm and less than 20.2 μm (Sample Nos. 62, 1, and 63), the tensile strength was higher than that when the average length Lr of the boundary layers 14 was 1.8 μm (Sample No. 61) or 20.2 μm (Sample No. 64).

DESCRIPTION OF THE REFERENCE NUMERICAL

2 . . . multilayer ceramic capacitor (capacitor sample)
4 . . . element body
6 . . . external electrode
61 . . . conductor
62 . . . non-metal component
10 . . . dielectric layer (ceramic layer)
12 . . . internal electrode layer
14 . . . boundary layer
16 . . . interface protrusion
16a . . . narrow part
16b . . . wide part

What is claimed is:

1. A ceramic electronic device comprising:
an element body formed by laminating a ceramic layer and an internal electrode layer; and
an external electrode electrically connected to at least one end of the internal electrode layer,
wherein
the element body includes a boundary layer at an end of the ceramic layer,
the ceramic layer includes a perovskite compound represented by ABO$_3$ as a main component,
the boundary layer includes Ba and Ti as a main component, and
the boundary layer includes 0.27-0.40 parts by mol of Ba, provided that a total of Ba and Ti included in the boundary layer is 1 part by mol.

2. The ceramic electronic device according to claim 1, wherein the perovskite compound is represented by (Ba$_{1-a-b}$Sr$_a$Ca$_b$)$_m$(Ti$_{1-c-d}$Zr$_c$Hf$_d$)O$_3$ and satisfies 0.94<m<1.1, 0≤a≤1, 0≤b≤1, 0≤c≤1, and 0≤d≤1.

3. The ceramic electronic device according to claim 2, wherein the perovskite compound represented by (Ba$_{1-a-b}$Sr$_a$Ca$_b$)$_m$(Ti$_{1-c-d}$Zr$_c$Hf$_d$)O$_3$ satisfies 0≤a<1, 0≤b<1, 0≤c<1, and 0≤d<1.

4. The ceramic electronic device according to claim 1, wherein the external electrode includes at least one of Cu, Cu alloys, Ag, and Ag alloys as a main component.

5. The ceramic electronic device according to claim 1, wherein the external electrode includes an interface protrusion on at least a part of a surface of the boundary layer.

6. The ceramic electronic device according to claim 5, wherein
the interface protrusion includes Ba, Ti, and Si as a main component, and
the interface protrusion includes 0.35-0.45 parts by mol of Ba, 0.10-0.30 parts by mol of Ti, and 0.35-0.45 parts by mol of Si, provided that a total of Ba, Ti, and Si included in the interface protrusion is 1 part by mol.

7. The ceramic electronic device according to claim 1, wherein the boundary layer has an average thickness of 2-20 μm.

8. The ceramic electronic device according to claim 1, wherein
the boundary layer is provided so as to contact with the internal electrode layer, and
the internal electrode layer includes Ni or Ni alloy as a main component.

9. A ceramic electronic device comprising:
an element body formed by laminating a ceramic layer and an internal electrode layer; and
an external electrode electrically connected to at least one end of the internal electrode layer,
wherein
the element body includes a boundary layer at an end of the ceramic layer,
a magnitude correlation between α, β, and γ satisfies β>γ>α, where a is a linear expansion coefficient of the ceramic layer, β is a linear expansion coefficient of the external electrode, and γ is a linear expansion coefficient of the boundary layer,
the external electrode includes an interface protrusion on at least a part of a surface of the boundary layer, and
a magnitude correlation between α, β, γ, and δ satisfies β>γ>α>δ, where δ is a linear expansion coefficient of the interface protrusion.

10. The ceramic electronic device according to claim 9, wherein
the boundary layer is provided so as to contact with the internal electrode layer, and
a magnitude correlation between α, γ, and σ satisfies γ>σ>α, where σ is a linear expansion coefficient of the internal electrode layer.

* * * * *